(12) United States Patent
Knöthig et al.

(10) Patent No.: US 12,378,505 B2
(45) Date of Patent: Aug. 5, 2025

(54) ADDITIVE FOR CLEANING SCR SYSTEMS

(71) Applicant: TUNAP GMBH & CO. KG, Wolfratshausen (DE)

(72) Inventors: Volker Knöthig, Weilheim in Oberbayern (DE); Alex Lange, Fürholzen (DE); Sergej Pawlitschek, Munich (DE)

(73) Assignee: TUNAP GMBH & CO. KG, Wolfratshausen (DE)

( * ) Notice: Subject to any disclaimer, the term of this patent is extended or adjusted under 35 U.S.C. 154(b) by 0 days.

(21) Appl. No.: 18/576,668

(22) PCT Filed: Jul. 4, 2022

(86) PCT No.: PCT/EP2022/068471
§ 371 (c)(1),
(2) Date: Jan. 4, 2024

(87) PCT Pub. No.: WO2023/280786
PCT Pub. Date: Jan. 12, 2023

(65) Prior Publication Data
US 2024/0368504 A1    Nov. 7, 2024

(30) Foreign Application Priority Data

Jul. 5, 2021 (EP) .................... 21883593

(51) Int. Cl.
*C11D 7/50* (2006.01)
*B01D 53/94* (2006.01)
(Continued)

(52) U.S. Cl.
CPC ........ *C11D 7/5013* (2013.01); *B01D 53/9418* (2013.01); *C11D 7/5022* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,489,419 A | 2/1996 | Diep et al. | |
| 6,361,754 B1 * | 3/2002 | Peter-Hoblyn | F01N 3/2066 422/177 |

(Continued)

FOREIGN PATENT DOCUMENTS

| | | |
|---|---|---|
| CN | 104907107 A | 9/2015 |
| EP | 2 129 452 B1 | 12/2009 |

(Continued)

OTHER PUBLICATIONS

Biuret, Solubility, Freely SOL in alcohol, very slightly SOL in ether, The Merck Index 9th ed. Rahway, New Jersey: Merck & Co., Inc., 1976, Hazardous Substances Data Bank, 86 pages.

(Continued)

*Primary Examiner* — Binh Q Tran
(74) *Attorney, Agent, or Firm* — Womble Bond Dickinson (US) LLP

(57) ABSTRACT

The present disclosure relates to the use of a polar solvent as an additive to a solution containing a component that releases ammonia at above 200° C. for the removal of deposits or impurities in a selective catalytic reduction system, wherein the polar solvent has a boiling point at 101.3 kPa of at least 140° C. The present disclosure further relates to a method of removing deposits or impurities in a selective catalytic reduction system and a method of operating a selective catalytic reduction system.

16 Claims, 1 Drawing Sheet

(51) Int. Cl.
*C11D 1/46* (2006.01)
*C11D 1/52* (2006.01)
*C11D 1/65* (2006.01)
*F01N 3/20* (2006.01)

(52) U.S. Cl.
CPC .... *F01N 3/2066* (2013.01); *B01D 2251/2067* (2013.01); *B01D 2257/404* (2013.01); *B01D 2258/012* (2013.01); *C11D 1/46* (2013.01); *C11D 1/52* (2013.01); *C11D 1/652* (2013.01); *C11D 7/5086* (2013.01); *C11D 7/5095* (2013.01); *F01N 3/206* (2013.01); *F01N 3/208* (2013.01); *F01N 2430/04* (2013.01); *F01N 2550/05* (2013.01); *F01N 2610/01* (2013.01); *F01N 2610/02* (2013.01); *F01N 2610/1453* (2013.01)

(56) References Cited

U.S. PATENT DOCUMENTS

| | | | |
|---|---|---|---|
| 7,947,241 B2 | 5/2011 | Schmelzle et al. | |
| 9,050,560 B2 | 6/2015 | Wasow et al. | |
| 10,399,035 B2 * | 9/2019 | Collin | |
| 2002/0028170 A1 * | 3/2002 | Sudduth | B01D 53/8625 423/235 |
| 2004/0025498 A1 * | 2/2004 | Lambert | F02M 53/00 60/320 |
| 2009/0031713 A1 * | 2/2009 | Suzuki | B01D 53/9409 252/73 |
| 2010/0015022 A1 | 1/2010 | Schmelzle et al. | |
| 2010/0050615 A1 * | 3/2010 | Johannessen | B01D 53/90 422/177 |
| 2012/0216510 A1 | 8/2012 | Xu et al. | |
| 2012/0219485 A1 | 8/2012 | Sebelius | |
| 2015/0108252 A1 * | 4/2015 | Ogawa | C11D 7/263 510/185 |
| 2017/0204767 A1 * | 7/2017 | Dougnier | C05G 5/37 |

FOREIGN PATENT DOCUMENTS

| | | |
|---|---|---|
| EP | 2 337 625 B1 | 6/2011 |
| EP | 2 488 283 B1 | 8/2012 |
| EP | 3 383 522 B1 | 10/2018 |
| JP | 2005000814 A | 1/2005 |
| JP | 2009035644 A | 2/2009 |
| JP | 2011190720 A | 9/2011 |
| WO | WO 94/08893 | 4/1994 |
| WO | 2000/030733 A1 | 6/2000 |
| WO | WO 2008/125745 A2 | 10/2008 |

OTHER PUBLICATIONS

European Communication for Application No. 22 744 681.2, dated Dec. 5, 2024, 1 page.
Japanese Office action for Patent Application No. 2023-580894, dated Jan. 7, 2025, 8 pages.
International Search Report of PCT/EP2022/068471, Sep. 30, 2022, 6 pages.
International Written Opinion of PCT/EP2022/068471, Sep. 30, 2022, 6 pages.
Extended European Search Report of 21183593.9, Dec. 23, 2021, 5 pages.
International Search Report of PCT/EP2022/068472, Sep. 30, 2022, 7 pages.
International Written Opinion of PCT/EP2022/068472, Sep. 30, 2022, 7 pages.
Dow, "Glycol Ether & Solvents Selection Guide / For Home and Institutional Care Applications" Technical Data Sheet, 4 pages.
Herr, Dissertation: "Thermische Zersetzung von Festharnstoff für mobile SCR-Katalysatoranwendungen," Dec. 1, 2004, 186 pages.
Schütte, Dissertation: "Ablagerungs- und Alterungsverhalten wässriger Harnstofflösung bei selektiver katalytischer Reduktion von Stickoxidemissionen," Jan. 18, 1979, 223 pages.
Gerd Kruse, Basf, Technisches Merkblatt AdBlue, "Hochreines NOX-Reduktionsmittel für Dieselmotoren, die mit SCRTechnologie ausgerüstet sind.," Apr. 2008, 6 pages.
Australian Office action for Application No. 2022308149, dated Mar. 20, 2025, 5 pages.

* cited by examiner

 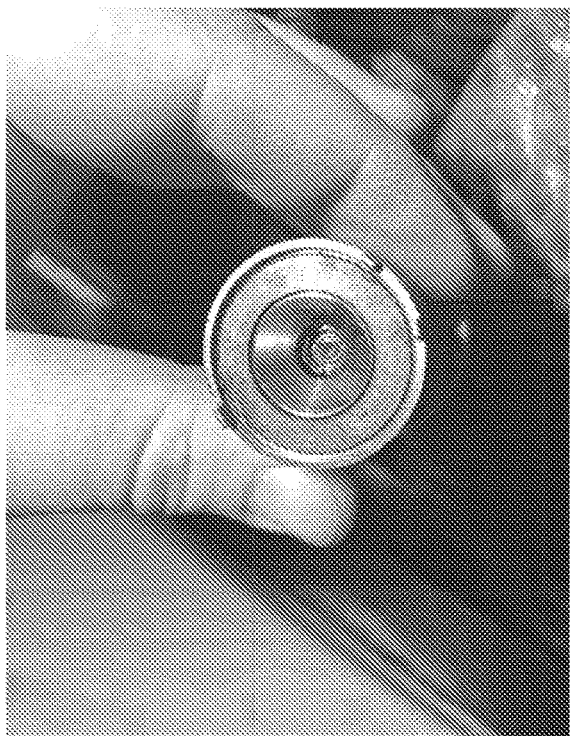
FIG. 1A  FIG. 1B
Figure 1
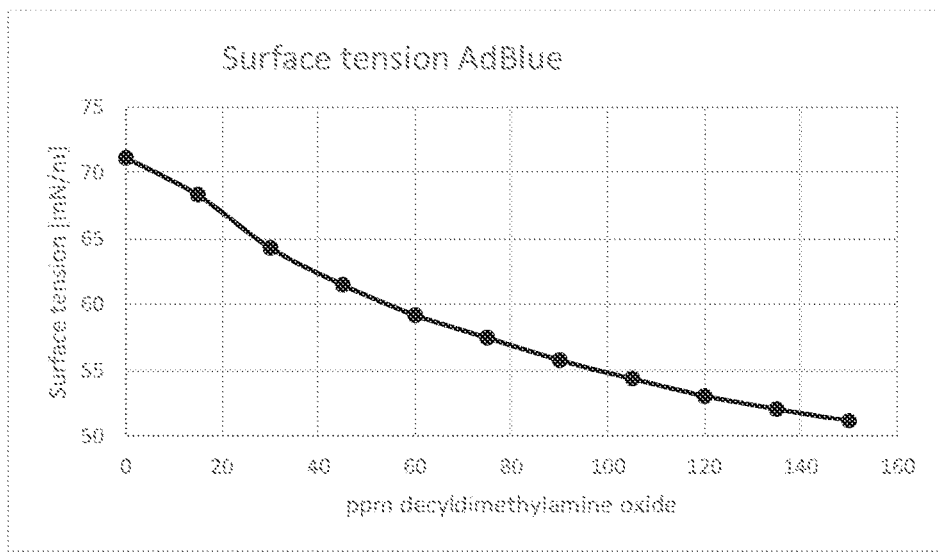
Figure 2

ADDITIVE FOR CLEANING SCR SYSTEMS

CROSS-REFERENCE TO RELATED APPLICATIONS

The present application is a U.S. national phase of International Application No. PCT/EP2022/068471 filed 4 Jul. 2022 which designated the U.S. and claims priority to European Patent Application No. 21 183 593.9 filed 5 Jul. 2021, the entire contents of each of which are hereby incorporated herein by reference.

FIELD OF THE DISCLOSURE

The present disclosure relates to the use of a polar solvent as an additive to an ammonia-releasing solution for the removal of deposits or impurities in a selective catalytic reduction system as well as to methods of removing deposits or impurities in a selective catalytic reduction system and to methods of operating a selective catalytic reduction system.

BACKGROUND

One of the major problems caused by combustion engines is nitrogen oxide (NOx) emissions. At EU level, minimum obligations to reduce overall NOx emissions are regulated in the NEC Directive (EU2016/2284). This provides for a 39% reduction by 2020 compared to 2005 and a 65% reduction by 2030. Achieving this value requires a major contribution from every area in which NOx is emitted. For combustion engines, this means working with selective catalytic reduction systems (SCR systems). Here, ammonia is split off or otherwise released from a chemical compound (usually urea) at operating temperature and this reacts with the NOx on a catalyst material to form nitrogen (N2) and water. Depending on the operating temperature, the catalyst material usually consists of vanadium- or zeolite-based material.

The main areas of application for SCR systems in combustion engines are diesel engines in cars, commercial and rail vehicles and ships. Urea solutions are typically used. In the maritime sector with a urea concentration of 40% (ISO 18611) and in other areas with 32.5% urea (DIN 70070 or ISO 22241). In addition to the urea content, these standards also describe transport and production, which impurities may be contained in which amounts and various other physico-chemical parameters, such as the surface tension at 20° C., which must be at least 65 mN/m according to ISO 22241. For motor vehicles in particular, AdBlue®, a trade name or trade mark of the German Association of the Automotive Industry (VDA), has become established. Standardization has the advantage that these standard solutions can be made available to the consumer at low cost and, on the other hand, the parameters and substances contained are so well described that catalyst poisoning or malfunctions in the various SCR designs cannot occur.

In an SCR system, urea decomposes on the catalyst in a first step to form ammonia (NH3) and isocyanic acid (HNCO). This reacts further with water to form ammonia and CO2. The ammonia generated reacts further with the nitrogen oxides to be removed from the exhaust gas to form nitrogen and water—i.e. harmless substances. Depending on the geometry, droplet distribution, dwell time and temperature at various points in the SCR system, side reactions of the isocyanic acid may take place, leading to undesirable deposits. Typical by-products or decomposition products of urea or isocyanic acid include biuret, cyanuric acid, ammelide, ammelin and melamine. The formation of deposits from the side reactions of urea decomposition depends on the operating conditions (outside temperature, driving/load/movement profile) and is only observed in relatively few cases. In most cases, the system is designed to be maintenance-free during normal operation.

However, in cases where deposits begin to form, this leads to a change in the surface of the SCR catalyst at various points, which in turn reduces the efficiency of the catalyst and therefore of the entire SCR system. In the worst case, malfunctions occur, the exhaust gas values no longer meet the standard and the vehicle/machine has to be taken out of service. Complex cleaning or even a component replacement may then be necessary. This leads to considerable costs and a waste of resources due to cleaning or replacing parts and the need for a replacement vehicle or machine.

Various solutions are described in the literature, all of which are based on a reduction or suppression of the formation of deposits in continuous use (so-called keep clean approach).

WO 94/08893 describes how the particle size of the injected urea solution can be reduced by adding surface-active substances. This is supposed to result in reduced deposit formation. A large number of anionic, cationic and non-ionic surface-active compounds are described, but the focus is on alcohol ethoxylates.

WO 2008/125745 A2 describes the addition of a "multifunctional" substance with an HLB value of 7 to 17 to an ammonia-releasing solution in order to specifically reduce the formation of cyanuric acid-based deposits.

EP 2 337 625 B1 describes how a mixture of two differently ethoxylated alcohols can also reduce the particle size of an injected urea solution and at the same time prevent the formation of turbidity (solubility problems) at low temperatures.

EP 2 488 283 B1 describes the addition of an additive consisting of a hydrocarbon chain and an ethoxylated part. This additive is also intended to reduce the formation of unspecified deposits from a 32.5% urea solution in the SCR catalyst.

However, all these proposals are based on the keep clean approach, i.e. avoiding the formation of new deposits, so that the additives mentioned must be added to the urea solution as far as possible permanently during operation and therefore the use of inexpensive standardized urea solution in water such as AdBlue® is not possible.

In addition, the problem solutions described in the literature are based on the use of surface-active substances, which greatly reduce the surface tension. On the one hand, this leads to foaming very quickly and, on the other hand, to the surface tension falling considerably below 65 mN/m at 20° C. specified in ISO standard 22241. Both of these factors jeopardize the reliable functioning of the SCR catalyst, depending on the details of the design. Foam formation may lead to major problems, in particular with compressed air-based dosing systems.

There may therefore be a need to overcome the problems and disadvantages of the prior art described above. In particular, there may be a need for an additive to an ammonia-releasing solution (such as AdBlue®) which is capable of removing pre-existing deposits or impurities in a system for the selective catalytic reduction of exhaust gases from diesel-fueled internal combustion engines, so that the additive does not have to be added permanently, but only when required, in particular in the case of pre-existing contamination.

SUMMARY OF THE DISCLOSURE

There may therefore be a need to provide an additive for an ammonia-releasing solution (such as AdBlue®) for removing (pre-existing) deposits or impurities in a system for the selective catalytic reduction of exhaust gases from diesel-fueled internal combustion engines.

Such a so-called clean up approach, i.e. the removal of existing deposits or impurities, makes it possible to clean an already contaminated SCR system without having to take the vehicle or machine out of operation and without having to replace the SCR system or parts of it. Also, such an additive does not have to be added permanently to the ammonia-releasing solution, but the SCR system may be operated most of the time with a cost-effective, standardized aqueous urea solution such as AdBlue® and the clean up additive only needs to be used, for example by adding it to the urea solution, as soon as impurities occur or have formed in the SCR system. At the same time, the surface tension and foaming behavior of the modified solution should remain as close as possible to the behavior of the original urea solution and the standard values should be met. In addition, it should have good solubility in both low and high concentrations in commercially available urea solutions such as Adblue® and also be stable there in the long term.

The inventors of the present disclosure have carried out extensive studies to solve this problem. Surprisingly, it has been shown that the reduction of surface tension plays no or only a subordinate role in the removal of existing deposits or impurities. The addition of a substance with a surfactant character is therefore not necessary for clean-up treatments or even rather disadvantageous due to the associated foaming behavior.

Rather, special polar solvents with a relatively high boiling point have proven to be suitable additives for the above-mentioned purposes and for solving the object, which also only need to be added in relatively small amounts to an ammonia-releasing solution (such as AdBlue®) in order to ensure effective removal of existing deposits or impurities in an SCR system.

Accordingly, the present disclosure relates to the use of a polar solvent as an additive to a solution containing a component that releases ammonia at above 200° C. (ammonia-releasing component) for the removal of (existing) deposits or impurities in a selective catalytic reduction system (of diesel-fueled internal combustion engines), wherein the polar solvent has a boiling point (boiling temperature) at 101.3 kPa of at least 140° C.

Furthermore, the present disclosure relates to a method of removing deposits or impurities in a selective catalytic reduction system (of exhaust gases (from diesel-fueled internal combustion engines)), wherein the system is operated with a solution containing a component that releases ammonia at above 200° C., wherein the solution further contains a polar solvent having a boiling point at 101.3 kPa of at least 140° C.

Further, the present disclosure relates to a method of operating a selective catalytic reduction system (of exhaust gases (from diesel-fueled internal combustion engines)), the method comprising injecting a solution containing a component that releases ammonia at above 200° C. into the system, the solution further containing a polar solvent having a boiling point at 101.3 kPa of at least 140° C., and heating the solution to a temperature above 200° C. in the system.

Further objects and advantages of embodiments of the present disclosure will become apparent from the following detailed description and the accompanying figures.

BRIEF DESCRIPTION OF THE FIGURES

FIG. 1 shows photographs of an SCR system before (FIG. 1A) and after (FIG. 1B) the addition of an additive according to the disclosure to a urea solution.

FIG. 2 shows test results on the dependence of the surface tension of an AdBlue® urea solution on the amount of an additive according to the disclosure added.

DETAILED DESCRIPTION OF THE DISCLOSURE

Further details of the present disclosure and further embodiments thereof are described below. However, the present disclosure is not limited to the following detailed description, but merely serves to illustrate the teachings according to the disclosure.

It should be noted that features described in connection with an exemplary embodiment may be combined with any other exemplary embodiment. In particular, features described in connection with an exemplary embodiment of a use according to the disclosure may be combined with any other exemplary embodiment of a use according to the disclosure and with any exemplary embodiment of a method according to the disclosure, and vice versa, unless expressly stated otherwise.

When a term is denoted by an indefinite or definite article, such as "a", "an" and "the", in the singular, this also includes the term in the plural and vice versa, unless the context clearly specifies otherwise. The terms "have" or "comprise" as used herein not only include the meaning of "contain" or "include", but may also mean "consist of" and "consist essentially of".

In a first aspect, the present disclosure relates to the use of a polar solvent as a (clean-up) additive to a solution containing a component that releases ammonia at above 200° C. for removing deposits or impurities in a selective catalytic reduction (SCR) system.

The term "clean up" as used herein means, in particular, a removal of existing or pre-existing deposits or impurities, in contrast to "keep clean", i.e. the prevention of the formation of new deposits or impurities.

The term "polar" as used herein means in particular that the solvent so designated has a certain polarity, for example a (permanent) electric dipole moment of at least $5\times10^{-30}$ Cm, in contrast to an apolar or hydrophobic solvent, such as a hydrocarbon. The polar solvent can be protic or aprotic.

In the context of the present application, a "solvent" is understood in particular to be a chemical compound which is capable of dissolving or at least partly dissolving or etching other components, in particular by-products or decomposition products of urea or isocyanic acid or other deposits or impurities which may be generated in an SCR system.

The polar solvent is characterized in particular in that it has a boiling point (or a boiling temperature) at 101.3 kPa (normal pressure) of at least 140° C. According to an exemplary embodiment, the polar solvent has a boiling point at 101.3 kPa of at least 150° C., in particular of at least 160° C., in particular of at least 180° C., in particular of at least 200° C. Advantageously, the polar solvent is in liquid form at the operating temperature of the SCR system. As a result, deposits or impurities in the SCR system can be removed particularly effectively by the polar solvent. The maximum boiling point of the polar solvent at 101.3 kPa is not particularly restricted and is preferably less than 500° C., in particular less than 400° C.

According to an exemplary embodiment, the polar solvent has a (permanent) electric dipole moment of at least $5\times10^{-30}$ Cm. The electric dipole moment, and in particular the permanent electric dipole moment, is a measure of the polarity of a molecule, which is usually caused by polar atomic bonds (e.g. due to different electronegativities of the atoms involved) or also by charges (e.g. in the case of zwitterionic compounds). In particular, the polar solvent may have a (permanent) electric dipole moment of at least $5.5 \times 10^{-30}$ Cm, in particular of at least $6 \times 10^{-30}$ Cm, in particular of at least $6.5 \times 10^{-30}$ Cm, in particular of at least $7 \times 10^{-30}$ Cm.

According to an exemplary embodiment, the polar solvent is miscible with water (at 20° C. and/or 101.3 kPa) in a concentration range from 10 ppm to 50% by weight (50% (m/m)), in particular without forming (two or more) phases, turbidity or an emulsion.

According to an exemplary embodiment, the polar solvent is configured such that a surface tension of a solution of 32.5% by weight of urea and 100 ppm of the polar solvent in water at a temperature of 20° C. (and a pressure of 101.3 kPa) is at least 55 mN/m, in particular at least 60 mN/m, in particular at least 65 mN/m. In other words, the polar solvent may be configured such that when 100 ppm thereof is added to a solution of 32.5% by weight of urea in water, the surface tension of the solution is not reduced to below 55 mN/m, in particular not to below 60 mN/m, in particular not to below 65 mN/m, which is advantageous in terms of (substantial) compliance with ISO standard 22241.

According to an exemplary embodiment, the polar solvent is characterized by a low foaming potential when used in an aqueous urea solution such as AdBlue® or another ammonia-releasing solution.

According to an exemplary embodiment, the polar solvent is selected from the group consisting of amine oxides, organic carbonates, condensation products of carboxylic acids with sarcosine, glucosides, polyalkylene glycols, glycol ethers, alcohols, aminoalcohols and mixtures thereof. Suitable amine oxides include in particular oxides of tertiary aliphatic amines, in particular C2-C22 alkyl amine oxides, such as N,N-dimethyl-C6-C14 alkylamine N-oxides. Suitable organic carbonates include, in particular, propylene carbonate. Suitable condensation products of carboxylic acids with sarcosine include in particular condensation products of fatty acids (in particular C2-C22 fatty acids) with sarcosine, optionally neutralized with amines or aminoalcohols. Suitable polyalkylene glycols include in particular polyalkylene glycols with a ratio of ethoxyl to propoxyl groups of at least 2:1 and polyethylene glycols (for example with an average molecular mass of 200 to 800 g/mol). Suitable glycol ethers include in particular dipropylene glycol n-propyl ether, dipropylene glycol n-butyl ether, propylene glycol n-butyl ether, propylene glycol n-propyl ether, tripropylene glycol n-butyl ether, propylene glycol phenyl ether, dipropylene glycol phenyl ether, dipropylene glycol dimethyl ether, propylene glycol methyl ether, propylene glycol methyl ether acetate, dipropylene glycol methyl ether, dipropylene glycol methyl ether acetate, tripropylene glycol methyl ether, ethylene glycol hexyl ether, diethylene glycol hexyl ether, ethylene glycol propyl ether, diethylene glycol phenyl ether, ethylene glycol phenyl ether, poly(oxy-1,2-ethanediyl) α-phenyl-ω-hydroxy, diethylene glycol ethyl ether, diethylene glycol n-butyl ether and ethylene glycol n-butyl ether. Suitable alcohols include in particular 3-methoxy-3-methyl-1-butanol. Suitable amino alcohols include in particular triethanolamine. Mixtures of two or more of the polar solvents mentioned are also suitable.

According to an exemplary embodiment, the polar solvent is selected from the group consisting of N,N-dimethyl-decylamine-N-oxide, propylene carbonate, polyethylene glycol, 3-methoxy-3-methyl-1-butanol, triethanolamine and mixtures thereof. In particular, N,N-dimethyldecylamine-N-oxide has proven to be particularly suitable for the effective removal of existing deposits or impurities in an SCR system.

According to an exemplary embodiment, the solution containing a component that releases ammonia at above 200° C. contains the polar solvent in an amount (concentration) of from 10 to 5000 ppm, in particular from 20 to 1000 ppm, in particular from 50 to 500 ppm, in particular from 75 to 400 ppm, in particular from 100 to 200 ppm. Amounts above 5000 ppm are also well suited, but generally do not bring about any further improvement in the removal of deposits or impurities.

According to an exemplary embodiment, the component that releases ammonia at above 200° C. comprises urea or a derivative thereof.

According to an exemplary embodiment, the solution containing a component that releases ammonia at above 200° C. is an aqueous urea solution, in particular with a concentration of 31 to 34% by weight of urea, in particular of about 32.5% by weight of urea, or also—for example in maritime applications—with a concentration of 38 to 42% by weight of urea, in particular of about 40% by weight of urea.

In a further aspect, the present disclosure relates to a method of removing deposits or impurities in a selective catalytic reduction system (in particular of exhaust gases from internal combustion engines fueled by diesel), wherein the system is operated with a solution containing a component that releases ammonia at above 200° C., wherein the solution further contains a polar solvent having a boiling point at 101.3 kPa of at least 140° C.

According to an exemplary embodiment, a polar solvent as described in more detail above can be used.

According to an exemplary embodiment, the solution comprising a component that releases ammonia at above 200° C. comprises the polar solvent in an amount (concentration) of from 10 to 5000 ppm, in particular from 20 to 1000 ppm, in particular from 50 to 500 ppm, in particular from 75 to 400 ppm, in particular from 100 to 200 ppm.

In still a further aspect, the present disclosure relates to a method of operating a selective catalytic reduction system (in particular of exhaust gases from diesel-fueled internal combustion engines), the method comprising injecting a solution containing a component that releases ammonia at above 200° C. into the system, the solution further containing a polar solvent having a boiling point at 101.3 kPa of at least 140° C., and heating the solution to a temperature above 200° C. in the system. By doing so, a removal of deposits or impurities in the SCR system may in particular be achieved.

According to an exemplary embodiment, a polar solvent as described in more detail above can be used.

According to an exemplary embodiment, the solution comprising a component that releases ammonia at above 200° C. comprises the polar solvent in an amount (concentration) of from 10 to 5000 ppm, in particular from 20 to 1000 ppm, in particular from 50 to 500 ppm, in particular from 75 to 400 ppm, in particular from 100 to 200 ppm.

The present disclosure is further described with reference to the following examples, which, however, serve only to illustrate the teachings according to the disclosure and are in no way intended to limit the scope of the present disclosure.

EXAMPLES

Tests about the Clean-Up Behavior of Various Additives in an SCR System

Additives Tested:
- N,N-Dimethyldecylamine-N-oxide (example 1)
- Polyethylene glycol 400 (example 2)
- C9-C11 fatty alcohol ethoxylate with 8 ethoxyl units (comparative example 1)

Mixtures of AdBlue® with 100 ppm of each of the tested additives were prepared and the surface tension of the resulting mixtures was determined at 20° C. A surface tension at 20° C. of 73.0 mN/m was determined for pure AdBlue® (i.e. without additives). In addition, the clean-up behavior of the mixtures was investigated in an SCR system heavily contaminated with deposits, whereby the presence of deposits was evaluated by visual assessment on a scale from 0 (clean) to 4 (heavily contaminated).

The results of the test are shown in Table 1:

TABLE 1

|  | Example 1 | Example 2 | Comparative example 1 |
|---|---|---|---|
| Surface tension of the mixture at 20° C. [mN/m] | 57.1 | 73.0 | 28.2 |
| Visual assessment of the deposits before using the mixture | 3 | 4 | 4 |
| Visual assessment of the deposits after using the mixture | 0 | 1 | 2 |

When using 100 ppm N,N-dimethyldecylamine-N-oxide (example 1), only a slight reduction in surface tension below the standard value of 65 mN/m and very low foaming behavior of the resulting solution was observed in the real application. However, considerable clean-up behavior was observed in a real SCR system that was very contaminated with deposits. FIG. 1 shows photographs of the SCR system before (FIG. 1A) and after (FIG. 1B) the use of the mixture according to example 1.

PEG 400 (example 2) has also proven to be an efficient additive for removing deposits in an SCR system, which further does not lead to a reduction in the surface tension of AdBlue®, so that the standard value of 65 mN/m can be maintained.

The tests have also shown that a surfactant character of the additive, as in comparative example 1, even leads to a deterioration of the clean-up behavior and is also disadvantageous due to a strong foam development and a strong lowering of the surface tension.

In addition, the dependence of the surface tension of an AdBlue® urea solution on the added amount of the additive N,N-dimethyldecylamine-N-oxide according to the disclosure was investigated. The test results are shown in FIG. 2. As can be seen from this, even higher concentrations of this additive only lead to a slight further reduction in surface tension.

The present disclosure has been described with reference to specific embodiments and examples. However, the disclosure is not limited thereto and various modifications thereof are possible without departing from the scope of the present disclosure.

The invention claimed is:

1. A method of using a polar solvent as an additive to a solution containing a component that releases ammonia at above 200° C. for removing deposits or impurities in a selective catalytic reduction system, wherein the polar solvent has a boiling point at 101.3 kPa of at least 140° C.

2. The method according to claim 1, wherein the polar solvent has an electric dipole moment of at least $5\times10^{-30}$ Cm.

3. The method according to claim 1, wherein the polar solvent is miscible with water in a concentration range from 10 ppm to 50% by weight without forming phases, turbidity or an emulsion.

4. The method according to claim 1, wherein the polar solvent is configured such that a surface tension of a solution of 32.5% by weight of urea and 100 ppm of the polar solvent in water at 20° C. is at least 55 mN/m.

5. The method according to claim 1, wherein the polar solvent is selected from the group consisting of amine oxides, organic carbonates, condensation products of carboxylic acids with sarcosine, glucosides, polyalkylene glycols, glycol ethers, alcohols, aminoalcohols and mixtures thereof.

6. The method according to claim 1, wherein the polar solvent is selected from the group consisting of N,N-dimethyldecylamine-N-oxide, propylene carbonate, polyethylene glycol, 3-methoxy-3-methyl-1-butanol, triethanolamine and mixtures thereof.

7. The method according to claim 1, wherein the polar solvent has a boiling point at 101.3 kPa of at least 160° C.

8. The method according to claim 1, wherein the solution containing a component that releases ammonia at above 200° C. contains the polar solvent in an amount of 10 to 5000 ppm.

9. The method according to claim 1, wherein the component that releases ammonia at above 200° C. comprises urea or a derivative thereof.

10. The method according to claim 1, wherein the solution containing a component that releases ammonia at above 200° C. is an aqueous urea solution.

11. A method of removing deposits or impurities in a selective catalytic reduction system, the method comprising:
    operating the system with a solution containing a component that releases ammonia at above 200° C., the solution further containing a polar solvent having a boiling point at 101.3 kPa of at least 140° C.

12. The method according to claim 11, wherein the polar solvent has an electric dipole moment of at least $5\times10^{-30}$ Cm.

13. The method according to claim 11, wherein the solution containing a component that releases ammonia at above 200° C. contains the polar solvent in an amount of 10 to 5000 ppm.

14. The method according to claim 4, wherein the polar solvent is configured such that a surface tension of a solution of 32.5% by weight of urea and 100 ppm of the polar solvent in water at 20° C. is at least 65 mN/m.

15. The method according to claim 7, wherein the polar solvent has a boiling point at 101.3 kPa of at least 180° C.

16. The method according to claim 10, wherein the solution containing a component that releases ammonia at above 200° C. is an aqueous urea solution with a concentration of 31 to 34% by weight of urea.

* * * * *